US010318700B2

(12) United States Patent
Gold et al.

(10) Patent No.: US 10,318,700 B2
(45) Date of Patent: Jun. 11, 2019

(54) MODIFYING A MANUFACTURING PROCESS OF INTEGRATED CIRCUITS BASED ON LARGE SCALE QUALITY PERFORMANCE PREDICTION AND OPTIMIZATION

(71) Applicant: International Business Machines Corporation, Armonk, NY (US)

(72) Inventors: Steven B. Gold, Wappingers Falls, NY (US); Wen Wei Low, Singapore (SG); Feng Xue, Singapore (SG); Yvonne Chii Yeo, Singapore (SG); Jung H. Yoon, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 68 days.

(21) Appl. No.: 15/695,071

(22) Filed: Sep. 5, 2017

(65) Prior Publication Data

US 2019/0073442 A1    Mar. 7, 2019

(51) Int. Cl.
 *G06F 17/50*    (2006.01)
(52) U.S. Cl.
 CPC ........ *G06F 17/5081* (2013.01); *G06F 17/505* (2013.01); *G06F 2217/08* (2013.01); *G06F 2217/12* (2013.01); *G06F 2217/68* (2013.01)
(58) Field of Classification Search
 CPC .................. G06F 17/5081; G06F 17/505
See application file for complete search history.

(56) References Cited

U.S. PATENT DOCUMENTS

| 5,240,866 A | 8/1993 | Friedman et al. |
| 5,761,064 A | 6/1998 | La et al. |

(Continued)

FOREIGN PATENT DOCUMENTS

| EP | 1048956 A2 | 11/2000 |
| WO | 2004092755 A1 | 10/2004 |
| WO | 2011143462 A1 | 11/2011 |

OTHER PUBLICATIONS

P. Mell et al., "The NIST Definition of Cloud Computing", National Institute of Standards and Technology, Information Technology Laboratory, Sep. 2011, pp. 1-7.

(Continued)

*Primary Examiner* — Stacy Whitmore
(74) *Attorney, Agent, or Firm* — Law Office of Jim Boice

(57) ABSTRACT

A computer-implemented method modifies a manufacturing process for integrated circuits. One or more processors receive sensor readings that identify failed integrated circuits from a batch of integrated circuits, where each of the integrated circuits includes a set of dynamic random access memory (DRAM) chips and a memory buffer, where the memory buffer provides an interface between a memory controller and the DRAM chips. The processor(s) identify, based on the sensor readings, a performance trending estimate of DRAM failures versus memory buffer failures in the identified failed integrated circuits. The processor(s) predict a fault analysis (FA) pareto based on the performance trending estimate, a location and address of each DRAM in the identified failed integrated circuits, and a wafer location on the wafer die on which each memory buffer that has the memory buffer failure, such that a manufacturing process for the integrated circuits is modified based on the FA pareto.

20 Claims, 13 Drawing Sheets

(56) References Cited

U.S. PATENT DOCUMENTS

| | | | |
|---|---|---|---|
| 5,923,553 A | 7/1999 | Yi | |
| 6,546,523 B1 | 4/2003 | Boorananut et al. | |
| 7,174,233 B1 | 2/2007 | Blackshear et al. | |
| 7,449,920 B2* | 11/2008 | Papanikolaou | G06F 13/4072 |
| | | | 326/86 |
| 7,752,581 B2* | 7/2010 | Lanzerotti | H01L 22/20 |
| | | | 324/762.05 |
| 8,185,780 B2 | 5/2012 | Brinkman et al. | |
| 8,887,013 B2 | 11/2014 | Nemazie et al. | |
| 9,286,585 B2 | 3/2016 | Dimarco et al. | |
| 2005/0138302 A1* | 6/2005 | Lusk | G11C 29/1201 |
| | | | 711/154 |
| 2005/0280443 A1* | 12/2005 | Papanikolaou | G06F 13/4072 |
| | | | 326/86 |
| 2008/0126881 A1 | 5/2008 | Bruckhaus | |
| 2008/0250265 A1 | 10/2008 | Chang et al. | |
| 2009/0297019 A1* | 12/2009 | Zafar | G03F 1/84 |
| | | | 382/145 |
| 2010/0251044 A1 | 9/2010 | Khatri et al. | |
| 2012/0023464 A1* | 1/2012 | Lin | G01N 21/8851 |
| | | | 716/52 |
| 2014/0310670 A1* | 10/2014 | Oberai | G06F 17/5081 |
| | | | 716/112 |
| 2015/0066431 A1 | 3/2015 | Zheng et al. | |
| 2015/0154746 A1* | 6/2015 | Zafar | G03F 1/84 |
| | | | 382/149 |
| 2015/0254125 A1 | 9/2015 | Kakui | |

OTHER PUBLICATIONS

Fadishei et al., "Job Failure Prediction in Grid Environment Based on Workload Characteristics". Computer Conference, 2009. CSICC 2009. 14th International CSI. IEEE, 2009.

Sahoo et al., "Critical Event Prediction for Proactive Management in Large-Scale Computer Clusters". Proceedings of the Ninth ACM SIGKDD International Conference on Knowledge Discovery and Data Mining. ACM, 2003.

* cited by examiner

MODIFYING A MANUFACTURING PROCESS OF INTEGRATED CIRCUITS BASED ON LARGE SCALE QUALITY PERFORMANCE PREDICTION AND OPTIMIZATION

BACKGROUND

The present invention relates to the field of integrated circuits, and particularly to the manufacture of integrated circuits. Still more particularly, the present invention relates to modifying a manufacturing process of a particular type of integrated circuits based on callout predictors.

SUMMARY

In one or more embodiments of the present invention, a computer-implemented method modifies a manufacturing process for integrated circuits. One or more processors receive sensor readings that identify failed integrated circuits from a batch of integrated circuits, where each of the integrated circuits includes a set of dynamic random access memory (DRAM) chips and a memory buffer, where the memory buffer provides an interface between a memory controller and the DRAM chips. The processor(s) identify, based on the sensor readings, a performance trending estimate of DRAM failures versus memory buffer failures in the identified failed integrated circuits. The processor(s) identify a location and address of each DRAM in the identified failed integrated circuits that has a DRAM failure, and a wafer location on a wafer die on which each memory buffer that has a memory buffer failure was formed. The processor(s) predict a fault analysis (FA) pareto based on the performance trending estimate, the location and address of each DRAM in the identified failed integrated circuits, and the wafer location on the wafer die on which each memory buffer that has the memory buffer failure, such that a manufacturing process for the integrated circuits is modified based on the FA pareto.

The described invention may also be implemented in a computer system and/or as a computer program product.

DETAILED DESCRIPTION

Figure 1:
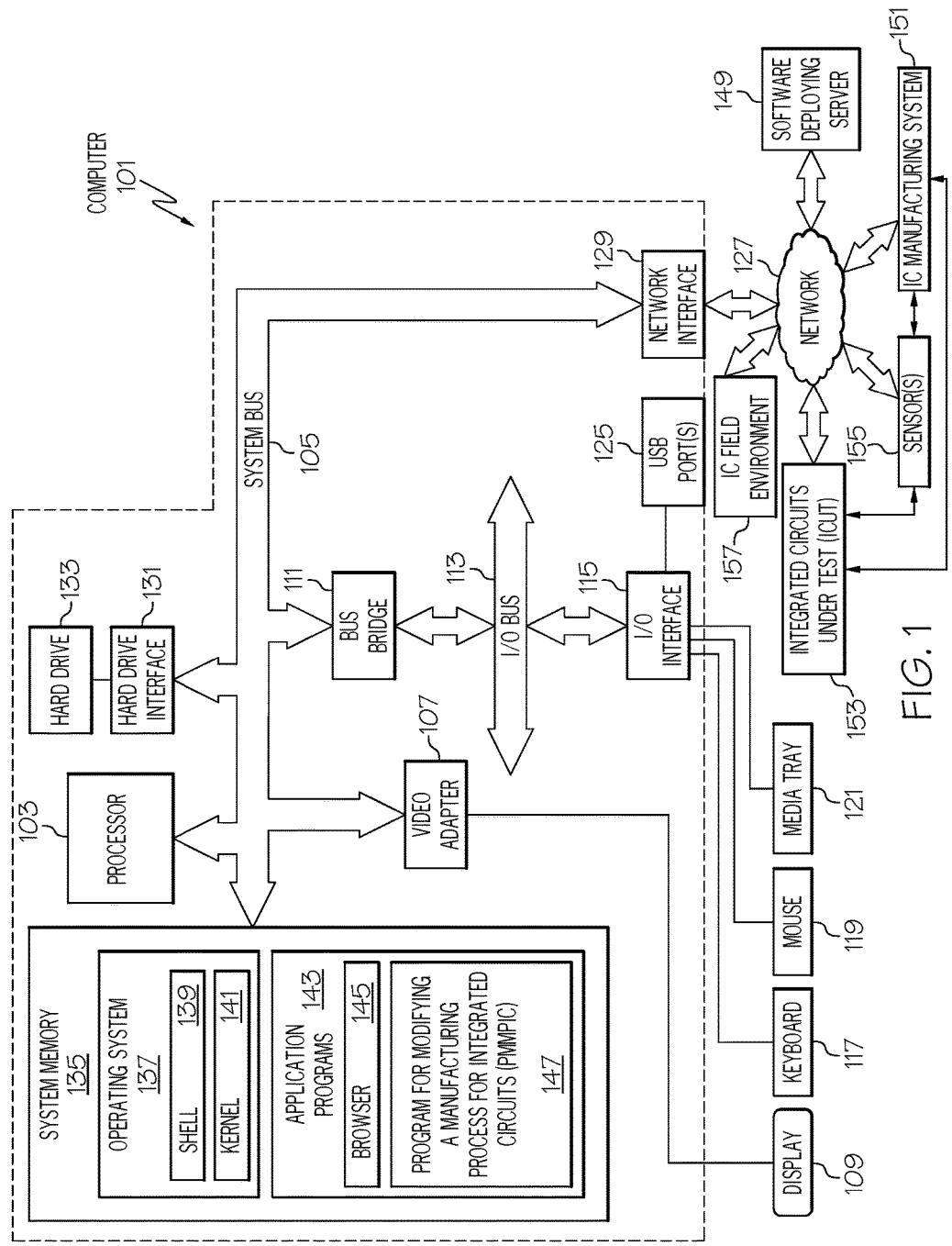
FIG. 1 depicts an exemplary system and network in which the present disclosure may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

One or more embodiments of the present invention are directed to an analytical and self-iterative failure symptom-rootcause correlation methodology for large scale quality performance prediction and optimization during the manufacturing of integrated circuits. As such, one or more embodiments of the present invention relate to the field of manufacturing or supply chain large scale quality performance prediction and optimization. Still more particularly, various embodiments of the present invention relate to an analytical and self-iterative methodology based on failure symptom-rootcause correlations.

In many product sectors (e.g. electronic devices, mechanical apparatus), one key quality control and improvement methodology involves rootcause analysis and identification of a failure (often known as failure analysis (FA)). Preventive actions are then derived (often via eight disciplines [8D] problem solving methodologies that identify, correct and eliminate recurring problems) for corrections and improvement in design process, manufacturing process and quality control process. Enterprises may then use this methodology for quality excursion management (i.e., in controlling deviations/excursions in the quality of the integrated circuits and their manufacture), but not as a routine/daily-basis quality control method over entire manufacturing population or field population. However, such a routine/daily-basis quality control is more useful in achieving sustainable product quality in the long term.

Thus, one or more embodiments of the present invention present a computer-implemented method that monitors and predicts large scale quality performance in manufacturing or field environment based on failure symptom and rootcause correlation. The method predicts a fault analysis (FA) pareto based on the failure symptom performance trending estimate.

Still more particularly, one or more embodiments of the present invention presents an implementation in the field of integrated circuit quality monitoring and optimization. The system automated maintenance package receives a signal that points to one or more failed integrated circuits from a batch of integrated circuits.

In one or more embodiments of the present invention, each of the integrated circuits includes a set of memory chips, each of which includes a set of dynamic random access memory (DRAM) chips and at least one associated memory buffer chip. The memory buffer provides an interface between the processor, the memory controller, and the DRAM chips. The system identifies, based on the sensor readings, a performance trending estimate of DRAM failures versus memory buffer failures in the identified failed integrated circuits. The system then identifies a location and address of each DRAM in the identified failed integrated circuits that has a DRAM failure. If the memory buffer has a fault, then the present invention identifies a wafer location on a wafer die on which each memory buffer that has a memory buffer failure was formed. The invention predicts a failure analysis (FA) pareto based on the correlation of the failure analysis results with the location and address of each DRAM in the identified failed integrated circuits, and the wafer location on the wafer die on which each memory buffer that has the memory buffer failure, and provides a means to modify a manufacturing process for the integrated circuits based on the FA pareto.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by software deploying server 149 and/or integrated circuit (IC) manufacturing system 151.

Exemplary computer 101 includes a processor 103 that is coupled to a system bus 105. Processor 103 may utilize one or more processors, each of which has one or more processor cores. A video adapter 107, which drives/supports a display 109 (which may be a touch-screen display capable of detecting touch inputs onto the display 109), is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multimedia interfaces, etc.), and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with a software deploying server 149 and/or other devices/systems using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include a Program for Modifying a Manufacturing Process for Integrated circuits (PMMPIC) 147. PMMPIC 147 includes code for implementing the processes described below, including those described in FIGS. 2-10, and in one or more embodiments for implementing the cloud process described in FIGS. 11-12. In one embodiment, computer 101 is able to download PMMPIC 147 from software deploying server 149, including in an on-demand basis, wherein the code in PMMPIC 147 is not downloaded until needed for execution. In one embodiment of the present invention, software deploying server 149 performs all of the functions associated with the present invention (including execution of PMMPIC 147), thus freeing computer 101 from having to use its own internal computing resources to execute PMMPIC 147.

The IC manufacturing system 151 is a manufacturing system that fabricates, assembles, tests, and/or modifies integrated circuits into a higher-level product (e.g., a chip, a server, a personal computer, etc.). For example, IC manufacturing system 151 may include a wafer fabrication device that creates wafer dies on integrated circuits (ICs); a wafer cutting machine that cuts ICs out of wafer dies; a testing device that probes and tests ICs, either while still on the wafer die or after being packaged in an IC chip device (e.g., a dual in-line memory module—DIMM chip); a computer aided design—computer aided manufacturing (CAD-CAM) system that designs and manufactures wafer dies and/or IC chips; etc. That is, the manufacture of IC chips such as the integrated circuit 202 (i.e., a memory chip) shown in FIG. 2 and/or the wafer die shown mapped by map 501 in FIG. 5 is performed by devices that are under the control of a managing computer, which may be a component of IC manufacturing system 151 or may be computer 101 shown in FIG. 1.

IC field environment 157 is an environment in which the integrated circuits are utilized (e.g., within a server, etc.). As such, the feedback data regarding problems with the integrated circuits may come internally from the IC manufacturing system 151 or may come from customer/field feedback from the IC field environment 157.

Figure 2:
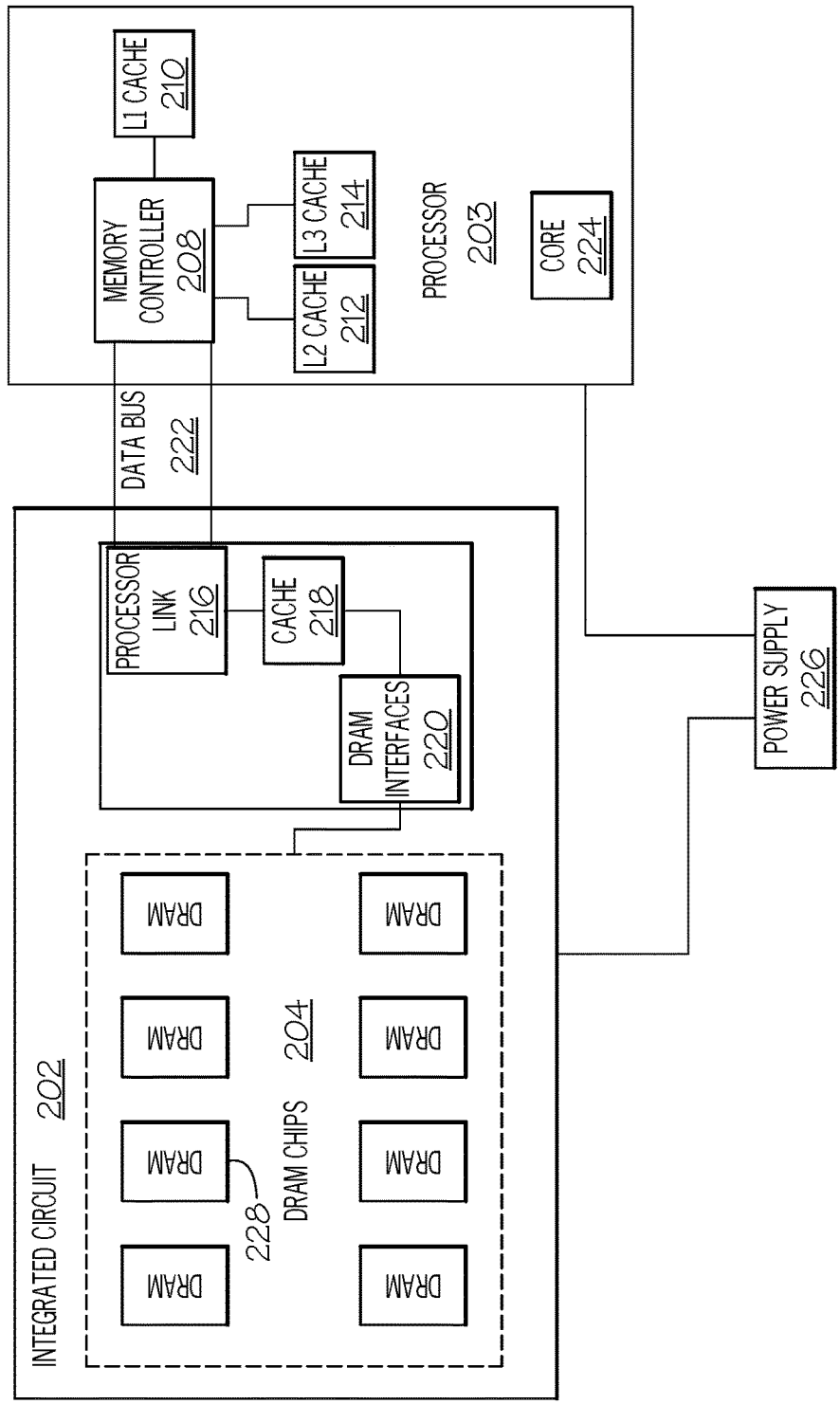
FIG. 2 illustrates a relationship between a processor and an integrated circuit in accordance with one or more embodiments of the present invention.
Figure 5:
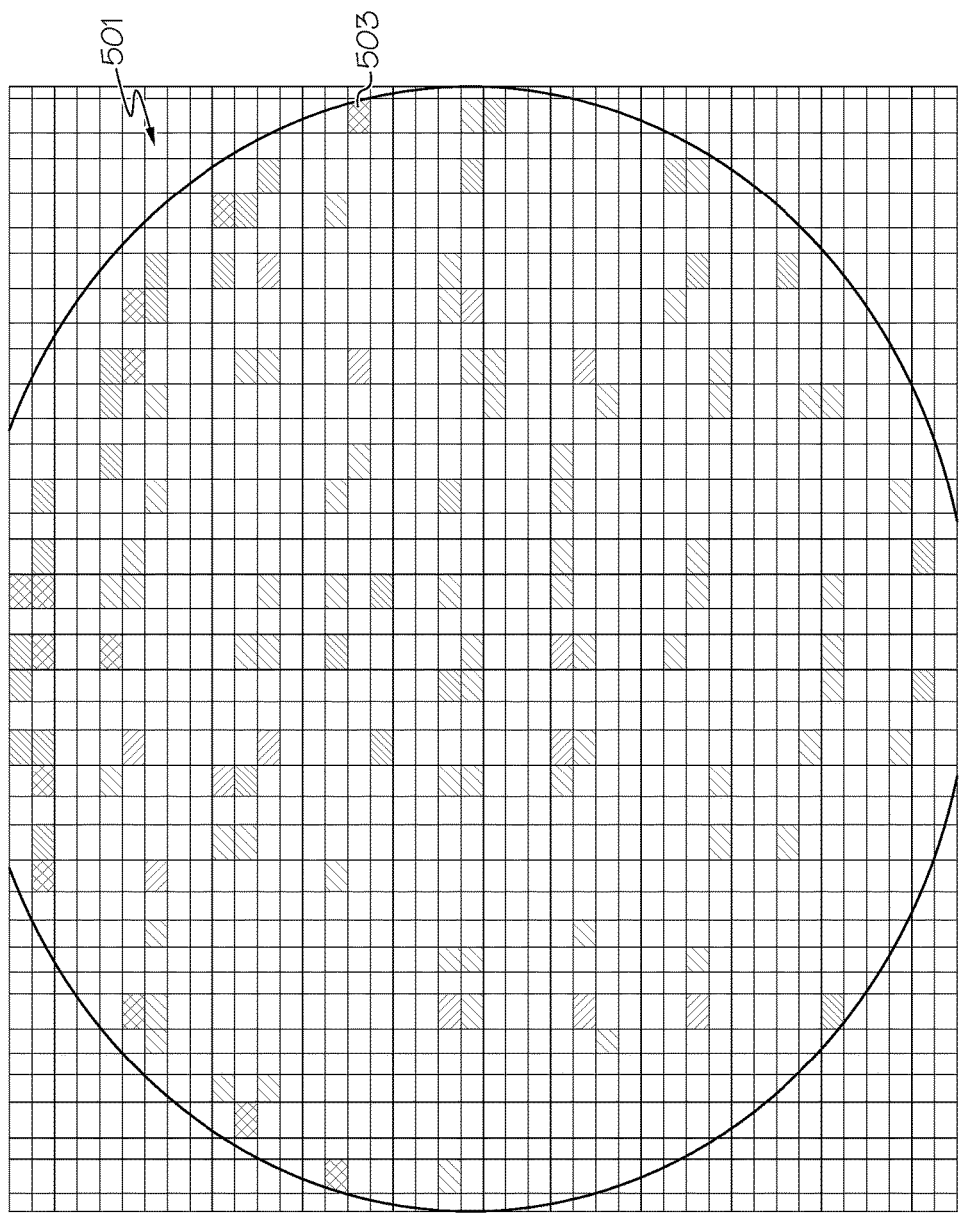
FIG. 5 illustrates an example of a map of defective buffer memory integrated circuits on a wafer in accordance with one or more embodiments of the present invention.

Integrated circuits under test (ICUT) 153 are integrated circuits such as the integrated circuit 202 shown in FIG. 2, and/or the wafer die that is mapped by map 501 in FIG. 5, and/or components thereof, such as one of the DRAM chips 204 or some or all of the memory buffer 206 shown within integrated circuit 202 in FIG. 2, and/or an integrated circuit (IC) such as the buffer memory IC 503 shown mapped in FIG. 5 to the physical wafer die (not depicted, but understood to be represented in size and shape and orientation by the map 501).

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

In many product sectors (e.g., electronic devices, mechanical apparatus), one key quality control and improvement methodology involves root cause analysis and identification of a failure (often known as failure analysis (FA)). Preventive actions are then derived for corrections and improvement in design process, manufacturing process and quality control process.

Many enterprises use this methodology for quality excursion management, but not as a routine/daily-basis quality control method over an entire manufacturing population or field population, where the latter is useful for achieving sustainable product quality in the long term.

One challenge encountered when applying this methodology on a large population of products as a routine quality control process is that of the cost of the failure analysis. Thus, many enterprises only perform failure analysis on selected samples.

Another challenge is the cycle time of failure analysis. It is not uncommon that the entire failure analysis cycle takes months, including RMA (Returned Material Authorization) which authorizes products to be returned/recalled. Necessary improvement actions are taken at a much later date, resulting in a larger "contaminated" population of product from certain design/manufacturing problems.

In addition, an intense data analytic capability is required for routine quality control over an entire manufacturing population or field population. Manual data processing is almost impossible.

In order to address these challenges, the present invention presents a self-iterative method based on failure symptoms to create a root cause knowledgebase, thus enabling analytics that allow large scale quality performance monitoring, prediction and optimization.

As such, a failure symptom is a failure characteristic that is associated with each of the fails/rejects of a device (either in manufacturing process or in the field). These failures are recorded together with parts identification (e.g., serial numbers (S/N), universally unique identifiers (UUIDs), etc.) and product attributes of each fails/rejects. In one or more embodiments of the present invention, this is achieved by an auto test log, field telemetry, a hotline, etc. (depending on the industry or the product sector). A complete dataset on failure symptoms is used in one or more embodiments of the present invention as the prerequisite to the method described herein.

A failure symptom category is denoted as FSC[n], and is one of the N (N=1, 2, 3 . . . n) categories for the failure symptom, as established via expertise in product/application. That is, analytics (e.g., a failure analysis—FA) will assign each failure (e.g., of an integrated circuit) to a particular type, such as a failure in the DRAM or a failure in the memory buffer, as described in detail below.

A failure root cause is the cause of the fails/rejects obtained through failure analysis (FA). The failure root cause is recorded against the parts identification (e.g. S/N) on each part that a failure analysis is performed. One or more embodiments of the method described herein do not require FA on all fails/rejects. However, the number of FA samples should be statistically sufficient for each failure symptom category (FSC).

A failure root cause category is denoted as FRC[m] from M (M=1, 2, 3 . . . m) categories for the failure root cause, established via expertise in product/manufacturing process.

In one or more embodiments, the present invention can be viewed as a five-step process: 1) calculating a weightage for each FA root cause of failures in the integrated circuits; 2) predicting the FA pareto; 3) determining a quality level of integrated circuits; 4) determining an overall quality level of data with known FA data and predicted quality level for unknown FA data; and 5) updating the weightage for each FA root cause based on new FA feedback as a self-iterative mechanism.

Thus, in an embodiment of the present invention, where an FA root cause is a cause of a failure in one or more of the integrated circuits, and the computer-implemented method further comprises calculating, by one or more processors, a weightage for each FA root cause of failures in the integrated circuits according to:

$$W_{FA}(A, T_b) = \sum \frac{f(A, T_b)}{F(A, T_b)}$$

where $W_{FA}$=a weightage for each FA root cause based on multi attribute A;

A=a multi attribute grouping by supplier, memory density, machine model, and test identifier code;

$T_b$=a time period for establishing baseline performance, where $T_b$ is a fixed time period that is longer than a time period of measurement $T_M$;

f=a fail quantity for the each multi attribute FA root cause; and

F=a total fail quantity for the multi attribute grouping.

Thereafter, one or more processors predict the FA pareto according to:

$$Q_{u,n}(A, T_M) = \sum \frac{F_u(A, T_M)}{I_u(A, T_M)} * W_{FA}(A, T_b)$$

where $Q_{u,n}$=a predicted quality level for integrated circuits with unknown FA data for a number n of FA root cause categories;

$F_u$=a fail quantity of integrated circuits with unknown FA data; and $I_u$=a quantity of integrated circuits with unknown FA data installed for the group A over a time period $T_M$.

Thereafter, the processor(s) determine a quality level of the integrated circuits according to:

$$Q_{k,n}(A, T_M) = \sum \frac{F_k(A, T_M)}{I_k(A, T_M)}$$

where $Q_{k,n}$=a quality level for integrated circuits k with known FA data for each number n of RA root cause categories;

$F_k$=a fail quantity of integrated circuits with known FA data; and $I_k$=a quantity of parts with known FA data installed for the group A over a time period $T_M$.

Thereafter, the processor(s) determine an overall quality level of data with known FA data and predicted quality level for unknown FA data, where the overall quality level is for each FA root cause category and multi attribute grouping, and where determining the overall quality level of data is according to:

$$Q_{FA}(A, T_M) = Q_k(A, T_M) + Q_u(A, T_M)$$

where $Q_{FA}$=an overall quality level for each FA root cause category for each multiple attribute grouping A over the time period $T_M$;

$Q_k$=a calculated quality level for integrated circuits with known FA data for each multiple attribute grouping A over the time period $T_M$, and $Q_u$=a predicted quality level for integrated circuits with unknown FA data.

Thereafter, the processor(s) update $W_{FA}$ based on new FA feedback as a self-iterative mechanism, wherein $W_{FA}$ is updated based on data from a latest rolling version of $T_b$.

Thus, in order to provide a process for improving overall quality of manufacture of devices such as integrated circuits (e.g., DIMMs), the present invention presents memory callout prognostics (predictors) for driving proactive quality improvement for enterprise grade custom integrated circuits. As described herein, a mapping of DRAM fails locations and addresses in an enterprise grade custom memory DIMM expedites failure analysis cycle time when modifying the manufacturing process of the DIMMs. Wafer mapping of memory buffer chip failure information in the enterprise grade custom memory DIMM further expedites failure analysis cycle time when modifying the manufacturing process of the memory buffer and the DIMMs.

For high performance enterprise server systems, an additional level in memory hierarchy is introduced in the form of an L4 cache. This is implemented using a high performance memory buffer in the enterprise grade custom integrated circuit to interface with the DIMMS and DRAMs. This allows higher bandwidth, lower latency communications and a more robust RAS feature.

For example, consider the integrated circuit 202 shown in FIG. 2. As depicted, integrated circuit 202 (e.g., a custom memory DIMM) has two main components: dynamic random access memory (DRAM) chips 204, and a memory buffer 206, which functions in part as a level 4 (L4) cache to processor 203 (analogous to processor 103 shown in FIG. 1). Thus, when a memory controller 208 in processor 203 wants to read or write data, it will first look to levels 1-3 of cache (e.g., L1 cache 210, L2 cache 212, and L3 cache 214). If the data is not available, rather than directly search for or write to random access memory chips within system memory 135 (shown in FIG. 1), the memory controller 208 will cause the processor 203 to read/write to/from a L4 cache on the integrated circuit 202, depicted in FIG. 2 as memory buffer 206.

As shown in FIG. 2, memory buffer includes a processor link 216, that communicates with memory controller 208. Processor link 216 communicates data from processor 203 to a cache 218. If the data being requested from processor 203 is not found in cache 218, then the memory buffer 206 will direct the DRAM interfaces 220 to retrieve the requested data from one or more of the DRAM chips 204, each of which (in one or more embodiments of the present invention) is a DIMM, a single inline memory module (SIMM), etc.

However, with the introduction of memory buffer 206, a true memory DRAM failure determination may be obscured by the complex memory hierarchy communication between the memory buffer 206 with the DRAM chips 204 and the server processor 203. That is, if processor 203 is unable to retrieve data from integrated circuit 202, the cause of such a failure may be due to a physical defect in one of the DRAM chips 204, the memory buffer 206, the memory controller 208, or the data bus 222 that allows communication between the processor 203 and the integrated circuit 202.

Thus, there is a limitation in the assessment as to whether a memory error on the system is due to the DRAM chips 204 or memory buffer 206 (in the integrated circuit 202), or communication issues within the integrated circuit 202 (e.g., caused by a problem with the processor link 216), a connection between the integrated circuit 202 and the processor 203 (e.g., data bus 222), or a component of the processor 203 itself (e.g., the memory controller 208 or even a core 224 within the processor 203).

Without being able to pinpoint which component on an integrated circuit is causing the error effectively, performance assessment of the integrated circuit is limited to analyzing all raw fails in which many are not true memory fails as evident from the supplier FA analysis. That is, if a batch of integrated circuits are returned to a manufacturer from a customer (since they did not work properly within the system being assembled by the customer), then the manufacturer may determine that 1) some of the failures are due to DRAM failures (e.g., failures in the DRAM chips 204 shown in FIG. 2) within the integrated circuit (e.g., integrated circuit 202 shown in FIG. 2); 2) some of the failures are due to memory buffer failures (e.g., failures in the memory buffer 206 shown in FIG. 2) in the integrated circuit; and 3) some of the failures are due to problems unrelated to the integrated circuit (i.e., there is nothing wrong with the integrated circuit, and thus the problem must be in the data bus 222, the processor 203, a power supply 226 to the processor 203 and/or the integrated circuit 202, etc.).

Thus, as described herein, the present invention provides a tool and methodology to aid in creating a unique identifier used to differentiate between DRAM callouts (fault identifiers in the DRAM) compared to memory buffer callouts (fault identifiers for the memory buffer) and miscellaneous callouts (e.g., fault identifiers of communication bus issues), which are used to automate all data collection related to issues with integrated circuits.

Callout trends are then further automatically and iteratively drilled down into key attributes (e.g., supplier, memory density, technology, etc.).

Each fail then has a failure analysis (FA) performed and categorized into defined FA buckets (e.g. wafer related fails, test coverage, electrostatic discharge (ESD) induced fails, workmanship/handling issues, etc.).

Each fail code identifier from the memory callout then defines a FA pareto percentage automatically based on historical FA data. For example, a fail code identifier A may correlate to 60% of wafer related issues. The underlying FA pareto data is then fed back into an automated system (e.g., manufacturing devices), which then improves the resolution of the first pass yield memory callout performance by a weightage based on the FA learning.

The automated feedback mechanism is established to self-iteratively adjust the callout performance prognosis based on the FA learning knowledgebase.

Thus, one or more embodiments of the present invention create an automated feedback mechanism against failure analysis data to iterate prescribed identifiers and enable refinements of callouts. This leads to the enabling of a callout failure analysis with precise failure data for DRAMs or memory buffers. Feedback learning callouts are then applied in order to segregate callout performance and drive supplier attributable performance against shipped product quality levels, thereby eliminating long lead times on supplier attributable data from FA by leveraging callout pareto percentages, in order to project performances of current batches of integrated circuits, thus leading to a process for improving the production of the integrated circuits. That is, by identifying the exact failure data for DRAM or memory buffers, the present invention provides a method to utilize the failure data to modify, and therefore improve, the manufacturing process for the integrated circuits, leading to improved integrated circuits with lower failure rates.

Figure 3:
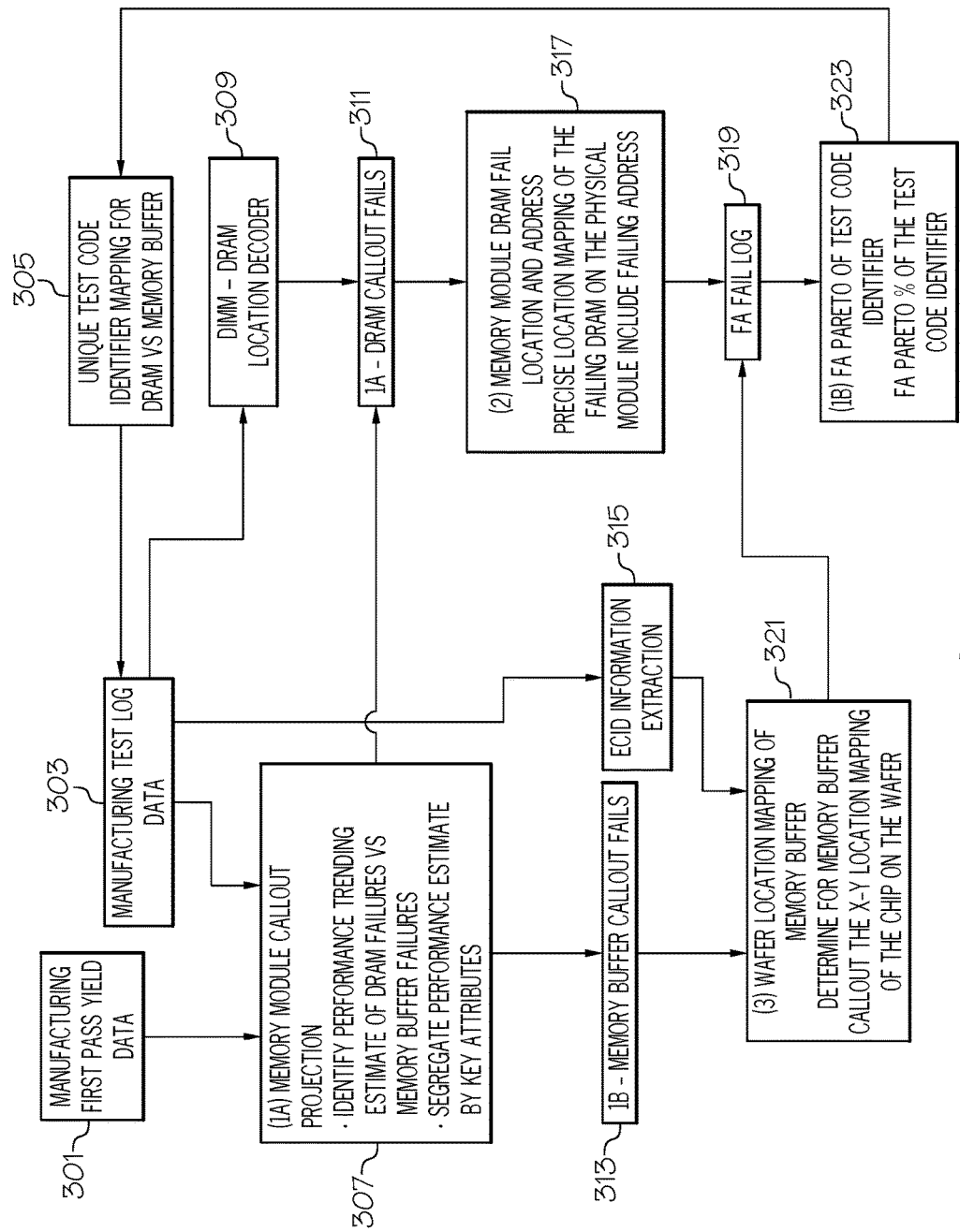
FIG. 3 is a high-level overview of one or more embodiments of the present invention.

With reference now to FIG. 3, a high-level overview of one or more embodiments of the present invention is presented. As shown in FIG. 3, the present invention has three main components: 1) integrated circuit callout projections and FA pareto updates for failed integrated circuits (see blocks 307 and 323); 2) identifying locations in the failed integrated circuits of DRAM failures (see block 317); and 3) identifying wafer locations of failed memory ICs used in memory buffer of failed integrated circuits (see block 321).

As shown in block 301 in FIG. 3, first pass yield data is received from the manufacturing. This data describes failed integrated circuits, as identified in the manufacturing test log data (see block 303).

The data from blocks 301 and 303 are used to establish an integrated circuit callout (fault identifiers) projection, as shown in block 307. That is, this data identifies which integrated circuits failed due to problems in the DRAM chips 204 shown in FIG. 2 versus which integrated circuits failed due to problems in the memory buffer 206 shown in FIG. 2. The data is thus segregated into performance estimates by key attributes (e.g., causes of the failures).

Figure 4:
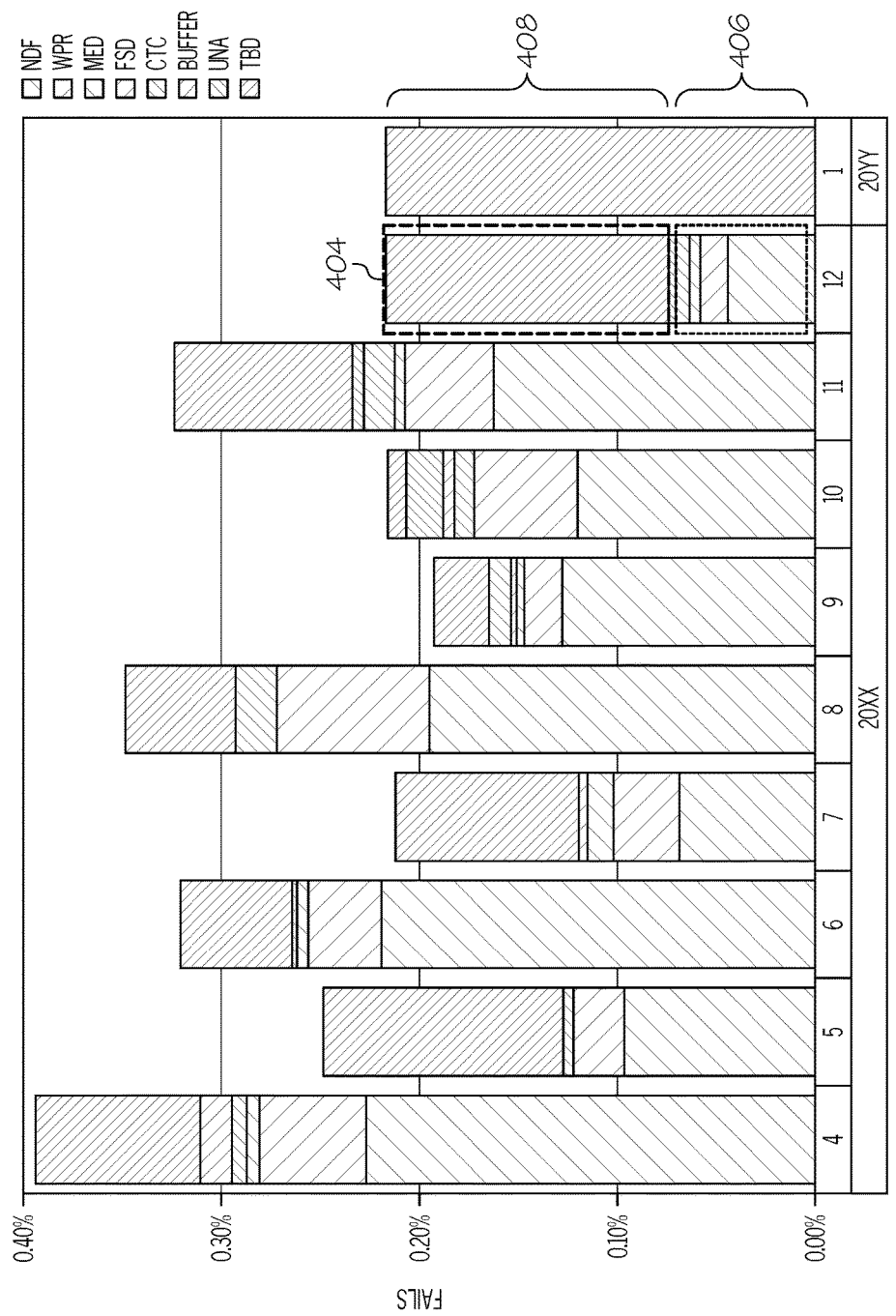
FIG. 4 depicts an exemplary pareto chart as utilized by one or more processors and/or other hardware devices in accordance with one or more embodiments of the present invention.

For example, consider pareto chart 402 shown in FIG. 4, which is generated based on data from the supplier/manufacturer of electronic components such as integrated circuits. Each pareto column from each month in a certain year identifies causes (if any and if known) of defects reported by a customer. That is, in some cases there is in fact no problem with the integrated circuits (No Defect Found—NFD), while in other integrated circuits defects are identified by the manufacturer based on known or unknown causes.

That is, known causes of problems with the integrated circuits are illustrated (for exemplary purposes) as Wafer Process Related (WPR), indicating a problem with how the wafer die is manufactured, cut, etc.; Mechanical Damage (MED), indicating that the integrated circuit was damaged by being physically hit, bent, etc.; Electrostatic Discharge (ESD), indicating that the integrated circuit was damaged during manufacturing, packaging, etc. by stray electrostatic discharges from a person or device that was not grounded; Complement Test Coverage (CTC), indicating that the problem with the integrated circuit is due to another complementary component that was identified by the CTC; and BUFFER, indicating that the problem was in the memory buffer in the integrated circuit.

Sometimes, however, the cause of the problem either is likely to never be known (UNA—unavailable), or else the test results have not been evaluated/received yet, after which time the cause of the fault should be determined (TBD—To Be Determined).

As shown in pareto column 404, some of the reasons for failures in parts identified in December 20XX are known, as described in section 406. However, other causes (TBD and UNA) of failures of failed integrated circuits identified in that month are still unknown, as described in section 408. Nonetheless, using the processes described herein, the present invention is able to make an accurate prediction of the defect causes from section 408. That is, the calculations described below provide a prediction of current fault causes based on past fault causes.

Returning to FIG. 3, once a determination is made as to whether faults are in the DRAM of the memory buffer, the system generates memory buffer callouts for memory buffer fails (block 313) and DRAM callouts for DRAM callout fails (block 311). As shown in block 317, the system then maps the failure to a particular DRAM in each failed integrated circuit. For example, the system (a manufacturer's testing device) may identify DRAM 228 to be the failed DRAM in integrated circuit 202 shown in FIG. 2. This information is then logged into a FA fail log (block 319).

Similarly, the system/testing device may identify the fault as being in the memory buffer. As shown in block 321, the system will use electronic component identification (ECID) information (see block 315) that is extracted from the manufacturing test log data (see block 303) to identify the memory buffer that is at fault. The system will then map that faulty memory buffer to a particular integrated circuit (IC) memory on the wafer/die from which it came. For example, assume that a failed memory buffer 206 was the memory buffer IC 503 shown in the map 501 of defective buffer memory ICs on a wafer/die. That is, the map 501 is a map of 1) buffer memory ICs that failed and 2) the location on the wafer/die from which the failed buffer memory ICs were cut. As shown in FIG. 5, the failed buffer memory IC 503 was located on the edge of the wafer/die, which may be an area that is prone to defects (e.g., due to imprecise cuts, more contaminations on the edges where they may be manually handled during manufacturing, etc.). Thus, as shown in block 321 in FIG. 3, the location of the failed buffer memory IC 503 on the wafer/die is determined/mapped, in order to determine the cause of the fault.

As shown in block 323, once the faults of DRAMs and/or buffer memories on the memory chips are ascertained, a FA pareto of test code identifiers is created based on the FA fail log shown in block 319. This FA pareto is then fed back into a unique test code identifier mapping for DRAM versus memory buffers (block 305), which is fed into the manufacturing test log data (block 303), and then into a DIMM-DRAM location decoder (block 309) in order to predict DRAM callouts. That is, assume that the process shown in FIG. 3 shows a history of DRAM fail percentages and memory buffer fail percentages during the past year. As such, the system will populate section 408 of pareto column 404 with these percentages as a prediction of the unknown causes of the current fails of the integrated circuits from the month of December 20XX.

Figure 6:
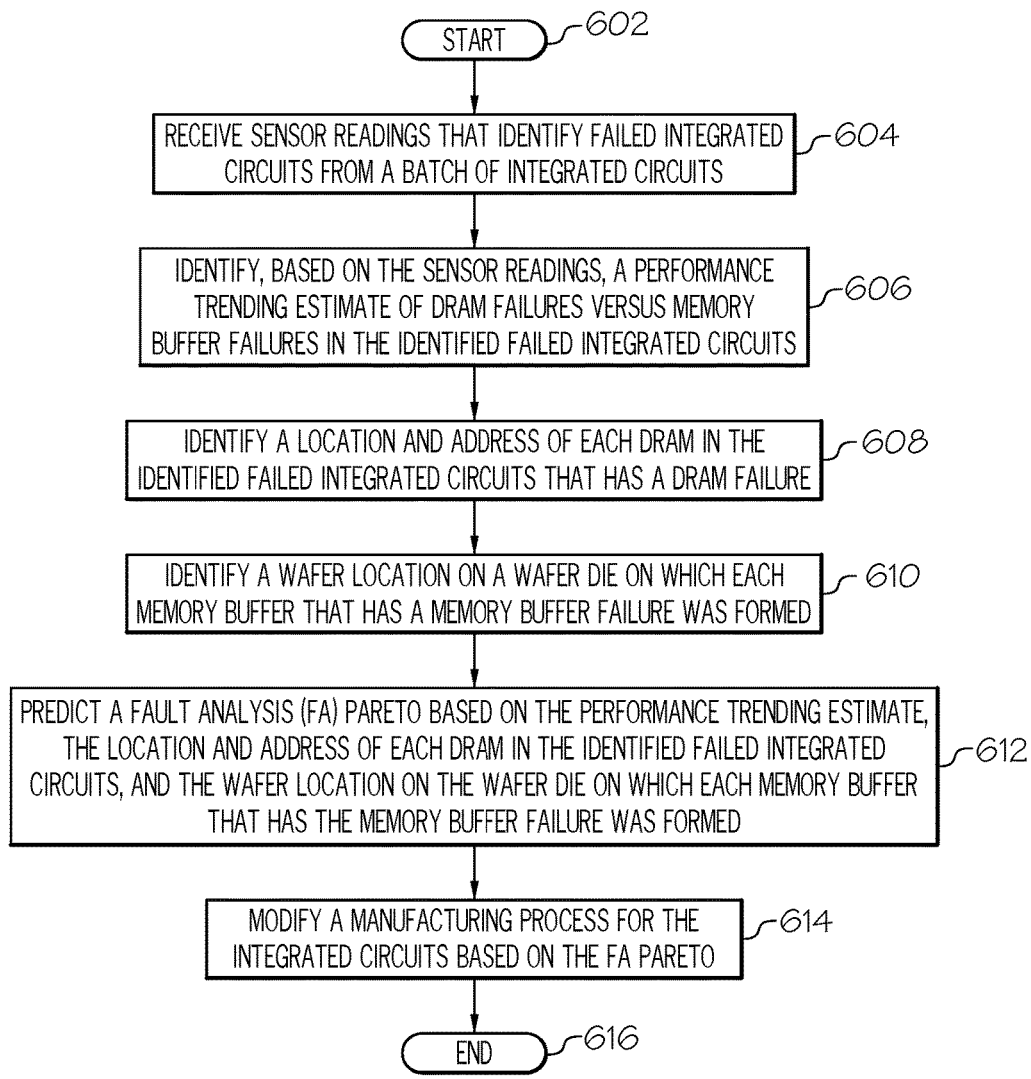
FIG. 6 is a high-level flow chart of one or more steps performed by one or more processors and/or other hardware devices in accordance with one or more embodiments of the present invention.

With reference now to FIG. 6, a high-level flow chart of one or more steps performed by one or more processors and/or other hardware devices in accordance with one or more embodiments of the present invention is presented.

After initiator block 602, one or more processors (e.g., processor 103 shown in FIG. 1) receive sensor readings (e.g., from sensor(s) 155 that are probes that test various components of the ICUT 153) that identify failed integrated circuits from a batch of integrated circuits, as described in block 604. Each of the integrated circuits (e.g., integrated circuits such as integrated circuit 202 shown in FIG. 2) includes a set of dynamic random access memory (DRAM) chips (e.g., DRAM chips 204) and a memory buffer (e.g., memory buffer 206), where the memory buffer provides an interface between a memory controller and the DRAM chips.

As described in block 606, the processor(s), based on the sensor readings, identify a performance trending estimate of DRAM failures versus memory buffer failures in the identified failed integrated circuits. That is, a trend of past failures of integrated circuits based on DRAM failures versus memory buffer failures is identified.

As described in block 608, the processor(s) identify a location and address of each DRAM in the identified failed integrated circuits that has a DRAM failure (e.g., based on the test results from sensor(s) 155 when probing/testing the ICUT 153.

As described in block 610, the processor(s) identify a wafer location on a wafer die on which each memory buffer that has a memory buffer failure was formed (see FIG. 5).

As described in block 612, the processor(s) predict a fault analysis (FA) pareto based on the performance trending estimate, the location and address of each DRAM in the identified failed integrated circuits, and the wafer location on the wafer die on which each memory buffer that has the memory buffer failure was formed (see FIG. 4).

As described in block 614, the processor(s) then modify a manufacturing process for the integrated circuits based on the FA pareto. That is, the processor(s) send instructions to the IC manufacturing system 151 (i.e., wafer fabrication devices, IC packaging systems, testing devices, etc.) to modify their operations according to the FA pareto. For example, if the FA pareto identifies past fails as being caused by improperly sliced buffer memory IC chips from wafers, then the device that slices/cuts such IC chips is adjusted to not harvest any chips that are on the edge of the wafer, if the wafer location on the wafer die so indicates that this is where problem memory buffer IC chips were harvested. Similarly, if the FA pareto for past batches of integrated circuits indicates that DRAMs in a particular location of the integrated circuit have a high history of fails (e.g., the location of DRAM 228 shown in FIG. 2), then connectors, insulation, etc. around that area are modified, in order to correct the problem.

The flow-chart shown in FIG. 6 terminates at terminator block 616.

In an embodiment of the present invention, the FA pareto predicts a cause of the DRAM failures and the memory buffer failures, even though the causes of the DRAM failures and the memory buffer failures are previously unknown. (See FIG. 4.) That is, in FIG. 4 the section 408 is replaced with predictions of DRAM and/or BUFFER faults as being the cause of the unknown fails.

Thus, and as described herein, one or more embodiments of the present invention perform automated segregation of manufacturing first pass yield data by callout information, thus establishing bucket fail code by identifier to generate initial projection of DRAM versus memory buffer performance trend lines. Callout trends can then be further drilled down into key attributes (supplier, memory density, technology, etc.), in order to predict the cause of current integrated circuit fails (failures).

As such, each fail will have a Failure Analysis (FA) performed and generalized into defined FA buckets. Each fail code identifier is defined by a FA pareto percentage automatically, which is fed back to the initial callout project to refine the first pass yield memory callout performance. In this way, memory performance for each month can be projected based on fail code FA pareto percentages, since the automated feedback mechanism iteratively adjusts the callout performance prognosis and derives a projection of memory performance by callout.

By mapping DRAM fail location, the system enables a focused FA and automated extraction of data into fail logs. As such, mapping data is extracted and decode parameters from the memory test log can be converted into a critical fail log (e.g., shown by rank, bank, row, column, symbol, port, etc.) into a query friendly data (e.g., icons). This allows the user to effectively identify the failing DRAM with the address to perform precise FA. That is, the system described herein identifies past failed DRAM locations in past failed integrated circuits, which allows the system to examine these DRAM locations on currently failed integrated circuits first, thus saving time.

As described herein, the wafer mapping of the memory buffer chip failure heat map may also enable the system to develop a direct correlation of memory buffer electronic chip ID (ECID) information with actual wafer map X/Y locations.

Thus, the present invention presents a new and novel methodology to infuse enhanced failure analysis technique through data analytics with a self-iterative feedback mechanism to derive high resolution memory performance monitoring. More specifically and in one or more embodiments, the present invention monitors and predicts large scale quality performance in a manufacturing or field environment based on failure symptom and rootcause correlation. The method predicts a fault analysis (FA) pareto based on the failure symptom performance trending estimate. Utilizing this automated and iterative fail analysis, proactive improvements are identified and implemented in the design and manufacturing process to improve overall product quality. One embodiment of the present invention is demonstrated herein via the implementation example in the field of integrated circuit quality monitoring and optimization.

Thus, as described herein and in one or more embodiments, the present invention presents a self-iterative method based on failure symptom to rootcause knowledge base and analytics for large scale quality performance monitoring, prediction and optimization in the production of integrated circuits such as memory modules, processors, application specific integrated circuits (ASICs), etc.

In one or more embodiments of the present invention, the terms "failure symptom"; "failure symptom category" (FSC); "failure rootcause"; "failure rootcause category" (FRC); FSC to FRC matrix (knowledge base); FSC weightage; and FRC weightage are used when describing the present invention. These terms are defined for use herein as:

Failure symptom: The failure symptom associated with each of the fails/rejects (either in the manufacturing process or in the field) are recorded together with parts identification (e.g. serial number—S/N) and product attributes of each fails/rejects. This recording, in one or more embodiments of the present invention, is achieved by an auto test log, field telemetry, a hotline etc. (depending on the industry or the product sector). In one or more embodiments of the present invention, a complete dataset of failure symptoms is used as a prerequisite when applying the method recited herein.

Failure symptom category: Denoted as FSC[n], the failure symptom category is the N (N=1, 2, 3 . . . n) categories for the failure symptom, established via expertise in product/application.

Failure rootcause: The failure rootcause is the cause of the fails/rejects obtained through failure analysis (FA). The failure rootcause is recorded against the parts identification (e.g. S/N) on each part that a failure analysis is performed. The present invention does not require a FA on all fails/rejects. However, a number of FA samples taken must be statistically sufficient for each FSC.

Failure rootcause category: Denoted as FRC[m], the failure rootcause category is the M (M=1, 2, 3 . . . m) categories for the failure rootcause, established via expertise in the product/manufacturing process.

FSC to FRC Matrix (knowledge base): In one or more embodiments of the present invention, for any product (e.g. memory DIMMs), or a product subset (e.g. 16 GB Memory, or 16 GB Memory from Vendor A), an N×M FSC to FRC matrix (knowledge base) is initialized from a training dataset. In one or more embodiments of the present invention, the training dataset contains the part identification, failure symptom category, failure rootcause, and product attributes data. In one or more embodiments of the present invention, the training dataset has a statistically sufficient quantity of samples for each FSC over a period of time, known as Tb (i.e., the time period for establishing baseline performance, such as an annual quarter, month, etc.).

FSC Weightage: Denoted as $W_{FSC}[n]$ (n=1, 2, 3 ... N), an FSC weightage is the percentage of fails/rejects in each FSC over total fails/rejects. Therefore $\Sigma_1^N W_{FSC}[n]=1$.

FRC Weightage: Denoted as $W_{FRC}[n,m]$ (n=1, 2, 3 ... N & m=1, 2, 3 ... M), FRC weightage is the actual elements in the N×M FSC to FRC matrix. As such, FRC weightage is the percentage of fails/rejects in each FRC over total fails/rejects. Therefore $\Sigma_1^M W_{FRC}[n,m]=W_{FSC}[n]$.

Consider now an exemplary FSC to FRC Matrix (knowledge base) illustration as shown in FIGS. 7-10.

Assume that a product (e.g., an IC such as a memory chip) has three FSC (i.e. N=3) and three FRC (i.e. M=3). Assume further that there are a total of 100 fails in the training set: 40 $FSC_1$, 30 $FSC_2$ and 30 $FSC_3$. Then $W_{FSC1}=0.4$, $W_{FSC2}=0.3$ and $W_{FSC3}=0.3$. Assume among 40 $FSC_1$, there are 20 $FRC_1$, 10 $FRC_2$ and 10 $FRC_3$. Assume that among 30 $FSC_2$, there are 15 $FRC_1$, 12 $FRC_2$ and 3 $FRC_3$. Assume that among 30 $FSC_3$, there are 3 $FRC_1$, 24 $FRC_2$ and 3 $FRC_3$.

Figure 7:
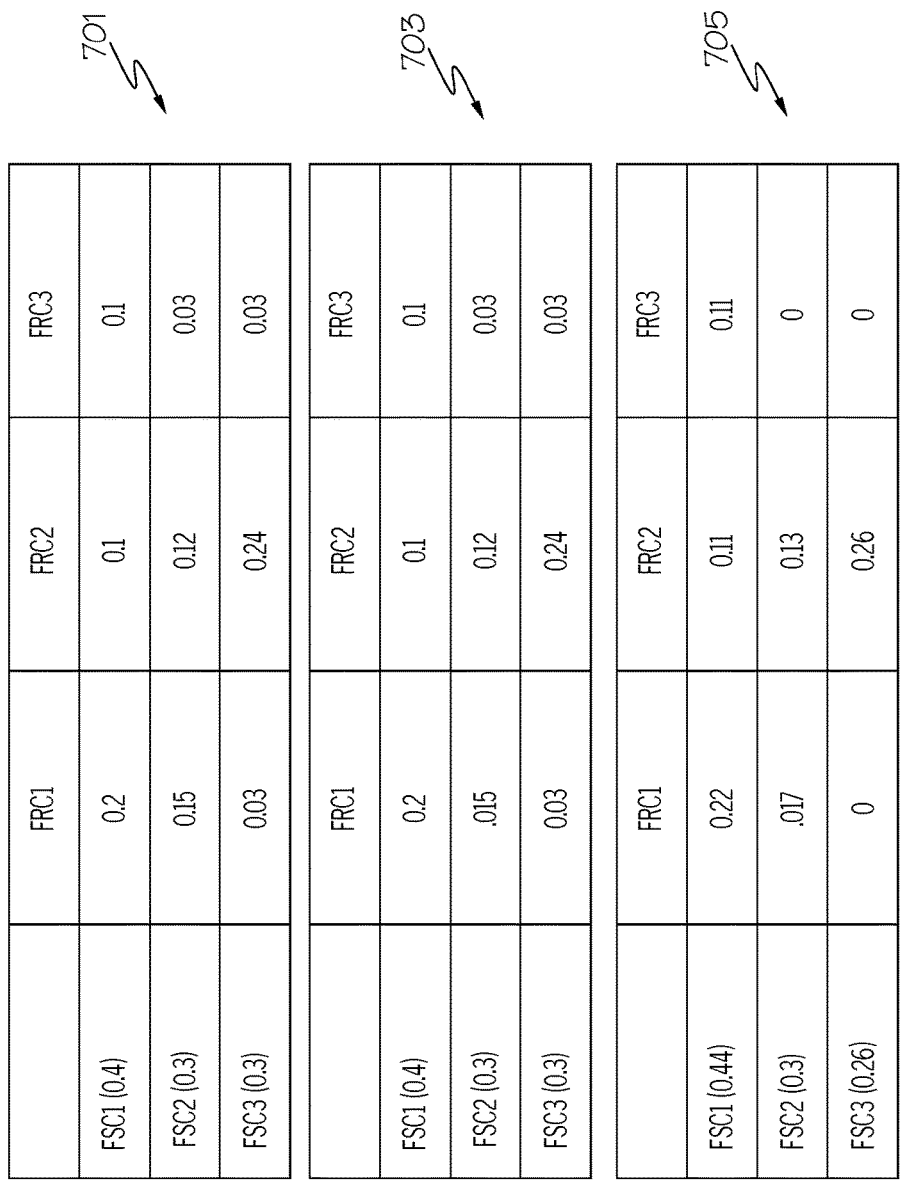
FIG. 7 illustrates several versions of exemplary failure symptom category (FSC) to failure rootcause category (FRC) matrices in accordance with one or more embodiments of the present invention.

Then the FSC to FRC matrix can be established as following:

$W_{FRC}[1,1]=0.2$, $W_{FRC}[1,3]=0.1$, $W_{FRC}[2,2]=0.12$, $W_{FRC}[3,3]=0.03$, as shown in matrix 701 in FIG. 7.

FSC to FRC Matrix (knowledge base) Trimming:

Any less statistically significant $W_{FRC}[n,m]$ is discarded to improve the noise level in the prediction algorithm later on. The statistically significant level, $\alpha$, can be set by user preference. In the present exemplary illustration, assume that a is set at 0.05. In this example then, $W_{FRC}[2,3]$, $W_{FRC}[3,1]$, and $W_{FRC}[3,3]$ are discarded from the matrix (total 9 samples), as shown in matrix 703 in FIG. 7.

A trimmed matrix based on the remaining 91 samples is then re-established using the same algorithm as shown in matrix 705 shown in FIG. 7, and ready to be used by the prediction algorithm.

Over a time period of measurement, denoted as $T_M$ (e.g. quarter, month, week, day, with $T_M$ being shorter than $T_b$), the total number of rejects/fails, denoted as F, from $T_M$ are collected. Depending on the FA sampling method and FA cycle time, the present invention thus is able to determine Fu, quantity of rejects/fails with unknown rootcause, and Fk, quantity of rejects/fails with known rootcause from FA, where F=Fu+Fk. In each FSC[n], the total number reject/fails is denoted as $F_n$, and $\Sigma_1^N F_n=F$. In each FSC[n], the number of reject/fails with unknown rootcause and know rootcause are denoted as $Fu_n$ and $Fk_n$ respectively. And $F_n=Fu_n+Fk_n$. In each FSC[n], $Fk_n$ is further broke into $Fk_{(n,m)}$ (m=1, 2, 3 ..... M). Each $Fk_{(n,m)}$ is the actual number of rejects/fails in the $m^{th}$ FRC from actual FA data.

In each FSC[n], $Fu_n$ is further broken into $Fu_{(n,m)}$ (m=1, 2, 3 ..... M) by the weightage algorithm:

$$Fu_{(n,m)} = Fu_n \frac{W_{FRC}[n,m]}{W_{FSC}[n]}$$

The weightage $W_{FRC}[n,m]$ is from the trimmed FSC to FRC matrix obtained previously.

Thereafter, for each FRC[m], the predicted total rejects/fails, denoted as Fm, is:

$$Fm=\Sigma_1^N(Fk_{(n,m)}+Fu_{(n,m)})$$

where $\Sigma_1^M F_m=F$. Then the total quality level, $Q_m$, for each FRC[m] is $$Q_m = \frac{Fm}{V}$$

where V is the total volume (e.g. manufacturing volume or install volume) in $T_M$.

$Q_m$ then represents the quality level of each rootcause. Investigations, corrective actions, and preventive actions are then taken on rootcauses with high $Q_m$ for continuous quality improvement.

The FA process will continue to feed in true FA data on $Fk_{(n,m)}$ after every $T_M$. The FSC to FRC Matrix (knowledge base) is refreshed at the end of every $T_M$. After the initial training dataset set up, $T_b$ is actually adjusted to $T_b$=previous k $T_M$ (where k is integer), as a "shift register". For example, if $T_M$=monthly, and k=4, then $T_b$ is the past one quarter. The FA data from the oldest $T_M$ is discarded. New FA data from the all remaining $T_M$ is added into the FSC to FRC Matrix (knowledge base), and the FSC Weightage and FCR Weightage is then re-calculated.

In one or more embodiments, the FA data in one $T_M$ is only available in next $T_M$. However, as long as the next $T_M$ is within $T_b$, new FA data from that next $T_M$ will be added for the refresh.

The trimming algorithm is then performed to establish a refreshed trimmed FSC to FRC Matrix (knowledge base) for the next $T_M$.

Data analytics (automated ETL [data extract, transform and load] and modeling of the matrix) may then be applied to the methodology recited herein in order to routinely establish quality control over large scales of manufacturing population or field population.

Figure 8:
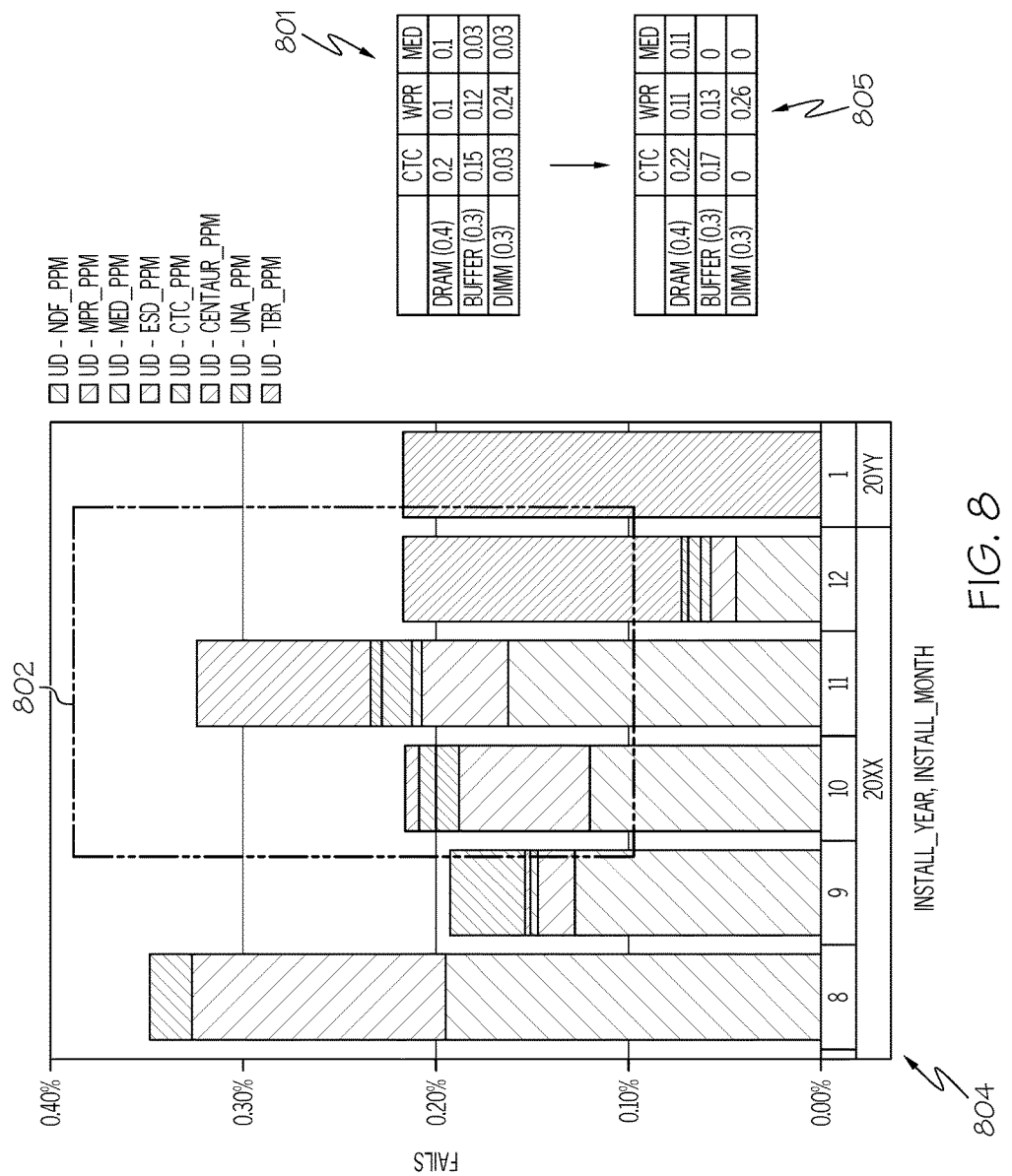
FIG. 8 depicts an exemplary monthly fault analysis (FA) pareto used to generate a FSC to FRC matrix.

With reference now to FIG. 8, an initial data set used for the FSC to FRC matrix (shown within area 802 in a monthly FA pareto 804) is used to generate a matrix 801 (analogous to matrix 701 shown in FIG. 7), which is then trimmed down to matrix 805 (in a manner analogous to that used to create matrix 705 as described in FIG. 7).

Figure 9A:
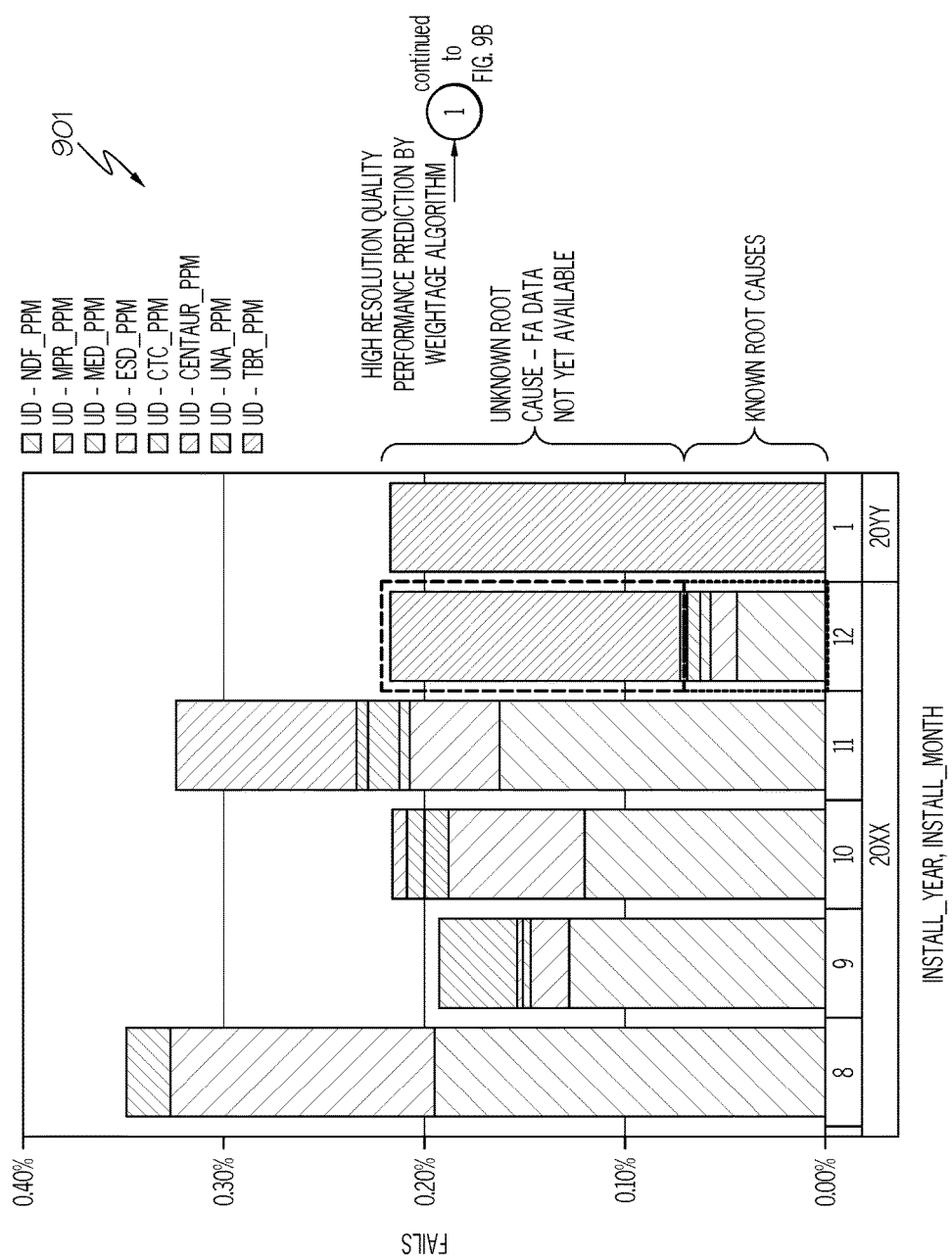
FIGS. 9A and 9B illustrate an exemplary predicted total quality level as derived from a performance prediction for a monthly FA pareto.

As shown in FIG. 9A, an exemplary monthly FA pareto 901, which has multiple unknown root causes for which FA data is not yet available, is used by the weightage algorithm discussed above to generate a performance prediction as shown in the modified monthly FA pareto 903. This leads to quality levels for faults such as those that are predicted to be wafer process related (WPR) related, complement test coverage (CTC) related, and mechanical damage (MED) related.

Figure 10:
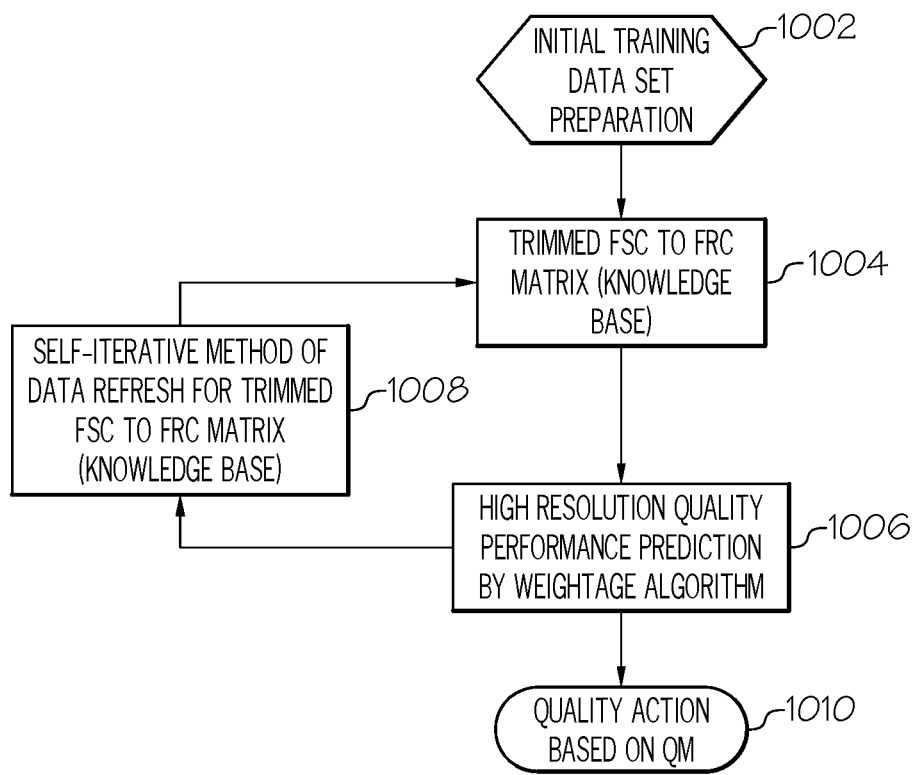
FIG. 10 presents a process overview of the processes depicted in FIGS. 7-9.

With reference now to FIG. 10, an overview of the embodiment just described is presented. As shown in block 1002, the initial training data set is prepared, as shown in matrix 702 in FIG. 7.

As shown in block 1004, the FSC to FRC matrix is trimmed, as shown in matrix 704 in FIG. 7.

Figure 9B:
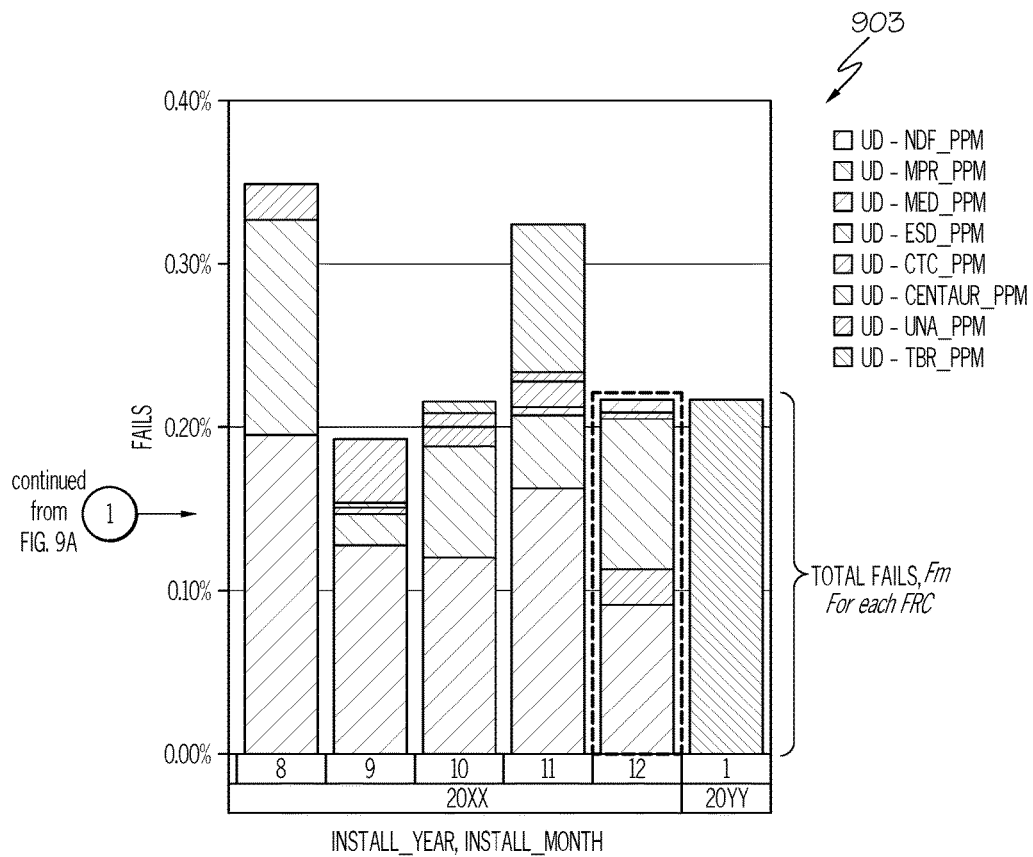
Figure 9B:
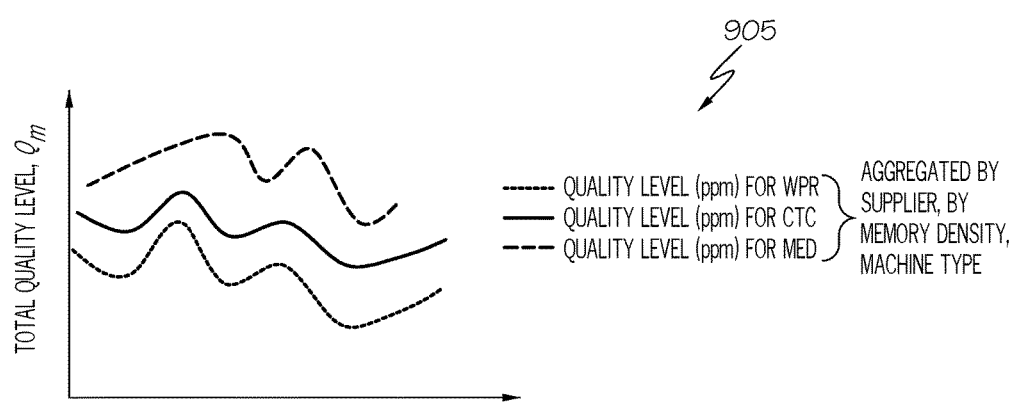

As shown in block 1006, a high resolution quality performance prediction generated by a weightage algorithm (see FIGS. 9A-9B) leads to a self-iterative method of data refresh for the trimmed FSC to FRC matrix (see FIG. 8 and block 1008 in FIG. 10), thus leading to reiterations that eventually lead to the performance of a quality action that is based on the total quality level $Q_m$ (see FIGS. 9A-9B and block 1010 in FIG. 10).

Thus, in one or more embodiments the present invention uses data analytic capability to address two fundamental quality concepts.

From a symptom to rootcause point of view, it is known that the correlation between symptoms and rootcauses is not universal. That is, one symptom may primarily be associated with two rootcauses, and another symptom may primary associated with a third rootcause, depending on the mechanism (e.g. device physics, mechanical physics). However, the FSC to FRC matrix (knowledge base) described herein provides a more mechanism-based prediction on the rootcause for the rejects/fails with an unknown FA.

The self-iterative method described herein is able to ensure the prediction follows the changes of the product design and manufacturing process. For example, one rootcause that contributed to the majority of fails could be reduced over time by the corrective actions. Over time it becomes irrelevant to current quality level. Meanwhile, a new rootcause may surface due to manufacturing process drift or material property drift. Therefore, the self-iterative approach presented herein ensures that the prediction is adaptive to the actual quality performance of the product.

This present invention may be applied to a large population of products as a regularly scheduled quality control process, based on the analytic and self-iterative methodology. The benefit of the proposed invention is in contrast to the limitations of the conventional approach which is based on only limited samples of failure analysis data and any manual processing of large scale data is almost impossible without data analytics capability.

Thus, one or more embodiments of the present invention provide an industry first methodology to employ failure symptom—rootcause correlation through data analytics with a self-iterative feedback mechanism to derive high resolution quality performance prediction and drive continuous large scale quality improvements.

The present invention may be implemented in one or more embodiments using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 11:
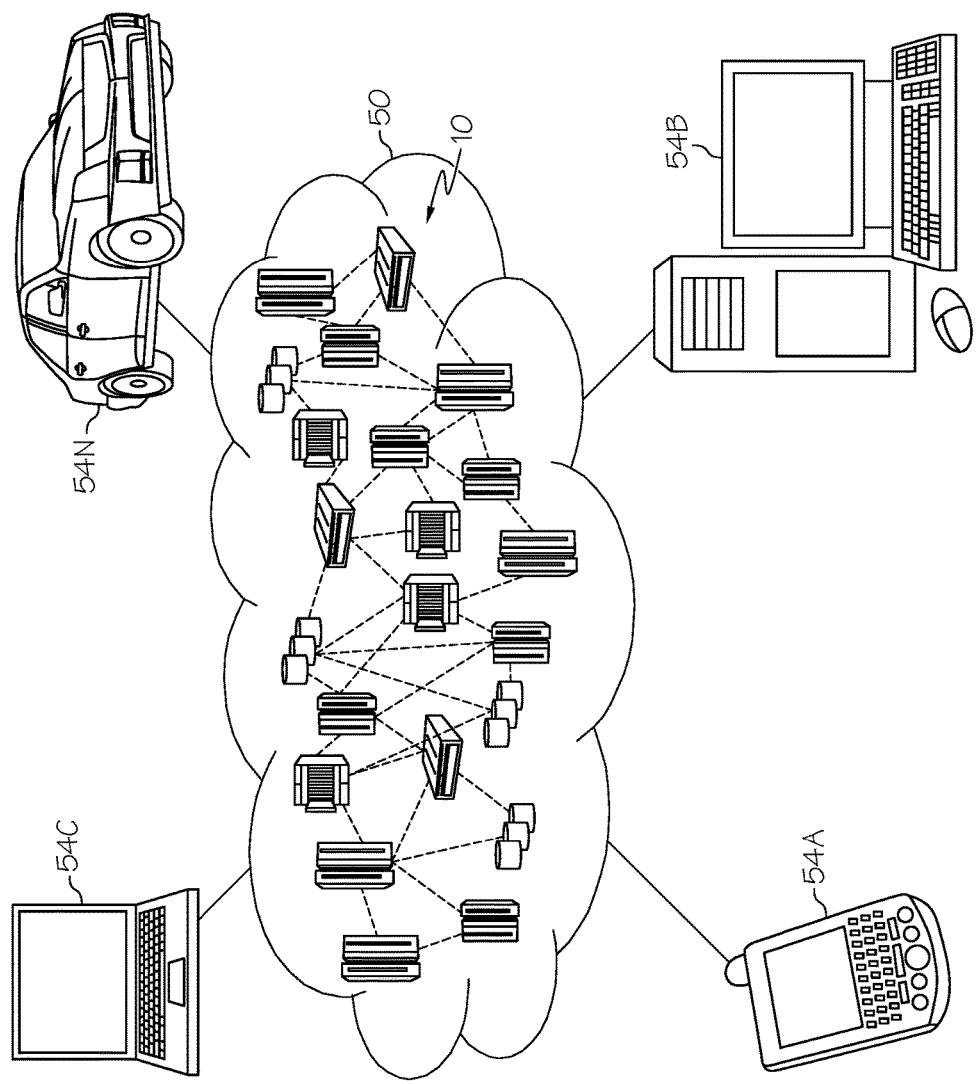
FIG. 11 depicts a cloud computing environment according to one or more embodiments of the present invention.

Referring now to FIG. 11, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 11 are intended to be illustrative only and that computing nodes 10 and cloud computing environment 50 can communicate with any type of computerized device over any type of network and/or network addressable connection (e.g., using a web browser).

Figure 12:
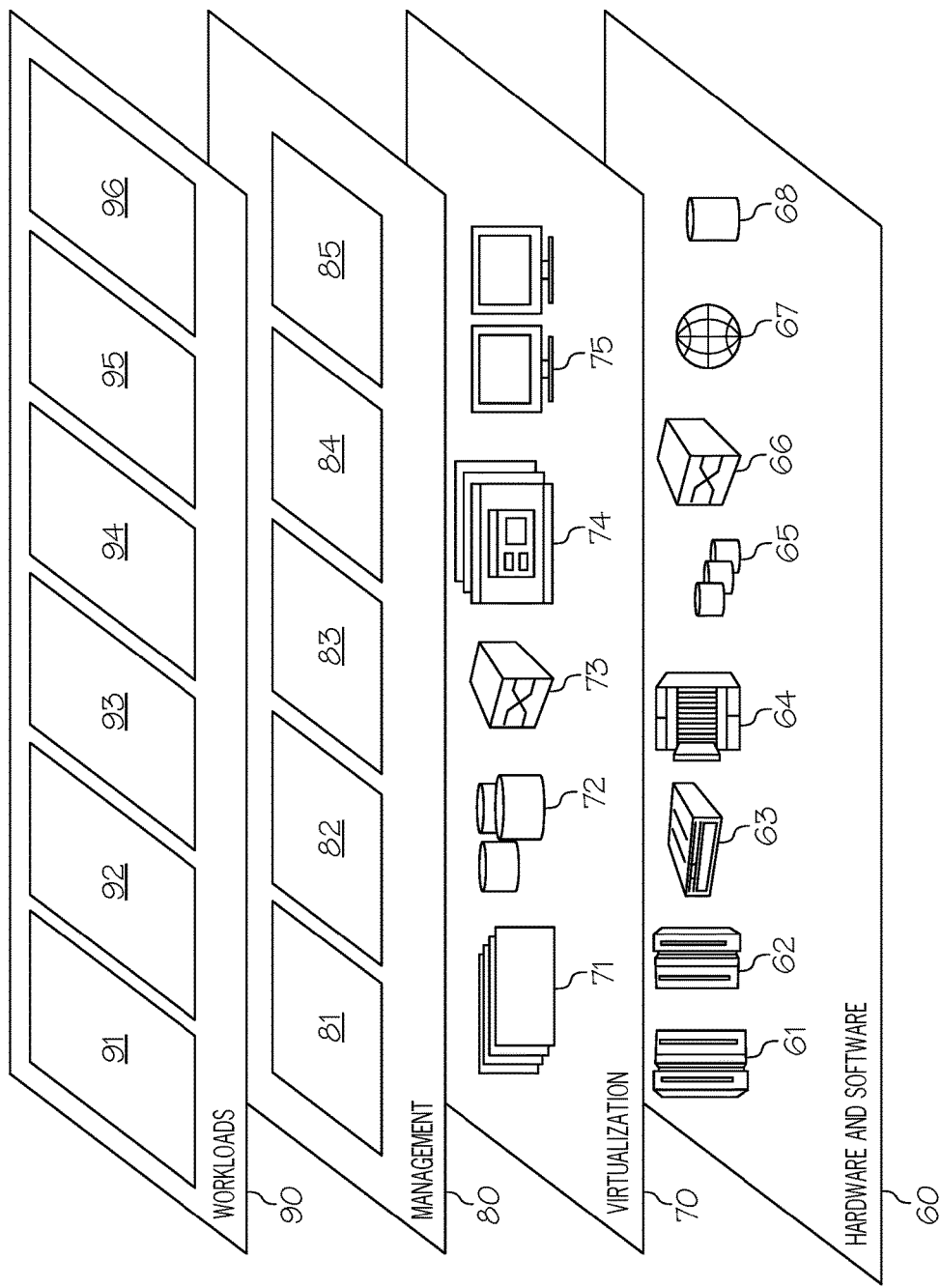
FIG. 12 depicts abstraction model layers of a cloud computer environment according to one or more embodiments of the present invention.

Referring now to FIG. 12, a set of functional abstraction layers provided by cloud computing environment 50 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and integrated circuit manufacturing control processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A computer-implemented method for modifying a manufacturing process for integrated circuits, the computer-implemented method comprising:

receiving, by one or more processors, sensor readings that identify failed integrated circuits from a batch of integrated circuits, wherein each of the integrated circuits comprises a set of dynamic random access memory (DRAM) chips and a memory buffer, wherein the memory buffer provides an interface between a memory controller and the DRAM chips;

identifying, by one or more processors and based on the sensor readings, a performance trending estimate of DRAM failures versus memory buffer failures in the identified failed integrated circuits;

identifying, by one or more processors, a location and address of each DRAM in the identified failed integrated circuits that has a DRAM failure;

identifying, by one or more processors, a wafer location on a wafer die on which each memory buffer that has a memory buffer failure was formed;

predicting, by one or more processors, a fault analysis (FA) pareto based on the performance trending estimate, the location and address of each DRAM in the identified failed integrated circuits, and the wafer location on the wafer die on which each memory buffer that has the memory buffer failure was formed; and modifying a manufacturing process for the integrated circuits based on the FA pareto.

2. The computer-implemented method of claim 1, wherein the FA pareto predicts a cause of the DRAM failures and the memory buffer failures, wherein the cause of the DRAM failures and the memory buffer failures is previously unknown.

3. The computer-implemented method of claim 1, wherein an FA root cause is a cause of a failure in one or more of the integrated circuits, and wherein the computer-implemented method further comprises:

calculating, by one or more processors, a weightage for each FA root cause of failures in the integrated circuits according to:

$$W_{FA}(A, T_b) = \sum \frac{f(A, T_b)}{F(A, T_b)}$$

where $W_{FA}$=a weightage for each FA root cause based on multi attribute A;

A=a multi attribute grouping by supplier, memory density, machine model, and test identifier code;

$T_b$=a time period for establishing baseline performance, where $T_b$ is a fixed time period that is longer than a time period of measurement $T_M$;

f=a fail quantity for the each multi attribute FA root cause; and

F=a total fail quantity for the multi attribute grouping.

4. The computer-implemented method of claim 3, further comprising:

predicting, by one or more processors, the FA pareto according to:

$$Q_{u,n}(A, T_M) = \sum \frac{F_u(A, T_M)}{I_u(A, T_M)} * W_{FA}(A, T_b)$$

where $Q_{u,n}$=a predicted quality level for integrated circuits with unknown FA data for a number n of FA root cause categories;

$F_u$=a fail quantity of integrated circuits with the unknown FA data; and $I_u$=a quantity of integrated circuits with the unknown FA data installed for the group A over the time period $T_M$.

5. The computer-implemented method of claim 4, further comprising:

determining, by one or more processors, a quality level of the integrated circuits according to:

$$Q_{k,n}(A, T_M) = \sum \frac{F_k(A, T_M)}{I_k(A, T_M)}$$

where $Q_{k,n}$=a quality level for integrated circuits k with known FA data for each number n of RA root cause categories;

$F_k$=a fail quantity of integrated circuits with the known FA data; and $I_k$=a quantity of parts with the known FA data installed for the group A over the time period $T_M$.

6. The computer-implemented method of claim 5, further comprising:

determining, by one or more processors, an overall quality level of data with the known FA data and predicted quality level for the unknown FA data, wherein said overall quality level is for each FA root cause category and multi attribute grouping, and wherein said determining the overall quality level of data is according to:

$$Q_{FA}(A,T_M)=Q_k(A,T_M)+Q_u(A,T_M)$$

where $Q_{FA}$=an overall quality level for each FA root cause category for each multiple attribute grouping A over the time period $T_M$;

$Q_k$=a calculated quality level for integrated circuits with the known FA data for each multiple attribute grouping A over the time period $T_M$; and $Q_u$=a predicted quality level for integrated circuits with the unknown FA data.

7. The computer-implemented method of claim 6, further comprising:

updating, by one or more processors, $W_{FA}$ based on new FA feedback as a self-iterative mechanism, wherein $W_{FA}$ is updated based on data from a latest rolling version of $T_b$.

8. The computer-implemented method of claim 1, wherein the computer-implemented method is implemented in a cloud environment.

9. A computer program product for modifying a manufacturing process for integrated circuits, the computer program product comprising a non-transitory computer readable storage device having program instructions embodied therewith, the program instructions readable and executable by a computer to perform a method comprising:

receiving sensor readings that identify failed integrated circuits from a batch of integrated circuits, wherein each of the integrated circuits comprises a set of dynamic random access memory (DRAM) chips and a memory buffer, wherein the memory buffer provides an interface between a memory controller and the DRAM chips;

identifying, based on the sensor readings, a performance trending estimate of DRAM failures versus memory buffer failures in the identified failed integrated circuits;

identifying a location and address of each DRAM in the identified failed integrated circuits that have a DRAM failure;

identifying a wafer location on a wafer die on which each memory buffer that has a memory buffer failure was formed;

predicting a fault analysis (FA) pareto based on the performance trending estimate, the location and address of each DRAM in the identified failed integrated circuits, and the wafer location on the wafer die on which each memory buffer that has the memory buffer failure was formed; and modifying a manufacturing process for the integrated circuits based on the FA pareto.

10. The computer program product of claim 9, wherein the FA pareto predicts a cause of the DRAM failures and the memory buffer failures, wherein the cause of the DRAM failures and the memory buffer failures is previously unknown.

11. The computer program product of claim 9, wherein an FA root cause is a cause of a failure in one or more of the integrated circuits, and wherein the method further comprises:

calculating a weightage for each FA root cause of failures in the integrated circuits according to:

$$W_{FA}(A, T_b) = \sum \frac{f(A, T_b)}{F(A, T_b)}$$

where $W_{FA}$=a weightage for each FA root cause based on multi attribute A;
- A=a multi attribute grouping by supplier, memory density, machine model, and test identifier code;
- $T_b$=a time period for establishing baseline performance, where $T_b$ is a fixed time period that is longer than a time period of measurement $T_M$;
- f=a fail quantity for the each multi attribute FA root cause; and
- F=a total fail quantity for the multi attribute grouping.

12. The computer program product of claim 11, wherein the method further comprises:

predicting the FA pareto according to:

$$Q_{u,n}(A, T_M) = \sum \frac{F_u(A, T_M)}{I_u(A, T_M)} * W_{FA}(A, T_b)$$

where $Q_{u,n}$=a predicted quality level for integrated circuits with unknown FA data for a number n of FA root cause categories;
- $F_u$=a fail quantity of integrated circuits with the unknown FA data; and
- $I_u$=a quantity of integrated circuits with the unknown FA data installed for the group A over the time period $T_M$.

13. The computer program product of claim 12, wherein the method further comprises:

determining a quality level of the integrated circuits according to:

$$Q_{k,n}(A, T_M) = \sum \frac{F_k(A, T_M)}{I_k(A, T_M)}$$

where $Q_{k,n}$=a quality level for integrated circuits k with known FA data for each number n of RA root cause categories;
- $F_k$=a fail quantity of integrated circuits with the known FA data; and
- $I_k$=a quantity of parts with the known FA data installed for the group A over the time period $T_M$.

14. The computer program product of claim 13, wherein the method further comprises:

determining an overall quality level of data with known FA data and predicted quality level for unknown FA data, wherein said overall quality level is for each FA root cause category and multi attribute grouping, and wherein said determining the overall quality level of data is according to:

$$Q_{FA}(A, T_M) = Q_k(A, T_M) + Q_u(A, T_M)$$

where $Q_{FA}$=an overall quality level for each FA root cause category for each multiple attribute grouping A over the time period $T_M$;
- $Q_k$=a calculated quality level for integrated circuits with the known FA data for each multiple attribute grouping A over the time period $T_M$; and
- $Q_u$=a predicted quality level for integrated circuits with the unknown FA data.

15. The computer program product of claim 14, wherein the method further comprises:

updating $W_{FA}$ based on new FA feedback as a self-iterative mechanism, wherein $W_{FA}$ is updated based on data from a latest rolling version of $T_b$.

16. The computer program product of claim 9, wherein the program instructions are provided as a service in a cloud environment.

17. A computer system comprising one or more processors, one or more computer readable memories, and one or more computer readable storage mediums, and program instructions stored on at least one of the one or more computer readable storage mediums for execution by at least one of the one or more processors via at least one of the one or more computer readable memories, the stored program instructions comprising:

program instructions to receive sensor readings that identify failed integrated circuits from a batch of integrated circuits, wherein each of the integrated circuits comprises a set of dynamic random access memory (DRAM) chips and a memory buffer, wherein the memory buffer provides an interface between a memory controller and the DRAM chips;

program instructions to identify, based on the sensor readings, a performance trending estimate of DRAM failures versus memory buffer failures in the identified failed integrated circuits;

program instructions to identify a location and address of each DRAM in the identified failed integrated circuits that has a DRAM failure;

program instructions to identify a wafer location on a wafer die on which each memory buffer that has a memory buffer failure was formed;

program instructions to predict a fault analysis (FA) pareto based on the performance trending estimate, the location and address of each DRAM in the identified failed integrated circuits, and the wafer location on the wafer die on which each memory buffer that has the memory buffer failure was formed; and program instructions to modify a manufacturing process for the integrated circuits based on the FA pareto.

18. The computer system of claim 17, wherein the FA pareto predicts a cause of the DRAM failures and the memory buffer failures, wherein the cause of the DRAM failures and the memory buffer failures is previously unknown.

19. The computer system of claim 18, wherein an FA root cause is a cause of a failure in one or more of the integrated circuits, and wherein the computer system further comprises:

program instructions to calculate a weightage for each FA root cause of failures in the integrated circuits according to:

$$W_{FA}(A, T_b) = \sum \frac{f(A, T_b)}{F(A, T_b)}$$

where $W_{FA}$=a weightage for each FA root cause based on multi attribute A,

A=a multi attribute grouping by supplier, memory density, machine model, and test identifier code, $T_b$=a time period for establishing baseline performance, where $T_b$ is a fixed time period that is longer than a time period of measurement $T_M$, f=a fail quantity for the each multi attribute FA root cause, and F=a total fail quantity for the multi attribute grouping;

program instructions to predict the FA pareto according to:

$$Q_{u,n}(A, T_M) = \sum \frac{F_u(A, T_M)}{I_u(A, T_M)} * W_{FA}(A, T_b)$$

where $Q_{u,n}$=a predicted quality level for integrated circuits with unknown FA data for a number n of FA root cause categories;

$F_u$=a fail quantity of integrated circuits with the unknown FA data; and $I_u$=a quantity of integrated circuits with the unknown FA data installed for the group A over the time period $T_M$;

program instructions to determine a quality level of the integrated circuits according to:

$$Q_{k,n}(A, T_M) = \sum \frac{F_k(A, T_M)}{I_k(A, T_M)}$$

where $Q_{k,n}$=a quality level for integrated circuits k with known FA data for each number n of RA root cause categories, $F_k$=a fail quantity of integrated circuits with the known FA data, and $I_k$=a quantity of parts with the known FA data installed for the group A over the time period $T_M$;

program instructions to determine an overall quality level of data with known FA data and predicted quality level for unknown FA data, wherein said overall quality level is for each FA root cause category and multi attribute grouping, and wherein said determining the overall quality level of data is according to:

$$Q_{FA}(A, T_M) = Q_k(A, T_M) + Q_u(A, T_M)$$

where $Q_{FA}$=an overall quality level for each FA root cause category for each multiple attribute grouping A over the time period $T_M$, $Q_k$=a calculated quality level for integrated circuits with the known FA data for each multiple attribute grouping A over the time period $T_M$, and $Q_u$=a predicted quality level for integrated circuits with the unknown FA data; and program instructions to update $W_{FA}$ based on new FA feedback as a self-iterative mechanism, wherein $W_{FA}$ is updated based on data from a latest rolling version of $T_b$.

20. The computer system of claim 17, wherein the stored program instructions are executed as a service in a cloud environment.

* * * * *